United States Patent [19]

Radecker et al.

[11] Patent Number: 5,615,100
[45] Date of Patent: Mar. 25, 1997

[54] RESONANT INVERTER

[75] Inventors: Matthias Radecker, Duisburg; Horst-Lothar Fiedler, Bochum, both of Germany

[73] Assignee: Fraunhofer-Gesellschaft zur Forderung der Angewanten Forschung e.V., Munich, Germany

[21] Appl. No.: 495,435

[22] PCT Filed: Jan. 25, 1994

[86] PCT No.: PCT/EP94/00196

§ 371 Date: Jul. 26, 1995

§ 102(e) Date: Jul. 26, 1995

[87] PCT Pub. No.: WO94/17585

PCT Pub. Date: Aug. 4, 1994

[30] Foreign Application Priority Data

Jan. 26, 1993 [DE] Germany ............... 43 02 056.9

[51] Int. Cl.⁶ ............... H02M 5/42; G05F 1/656
[52] U.S. Cl. ............... 363/97; 323/222
[58] Field of Search ............... 363/16, 95, 97, 363/123, 131; 323/222, 282

[56] References Cited

U.S. PATENT DOCUMENTS

| | | | |
|---|---|---|---|
| 3,641,422 | 2/1972 | Farnsworth et al. | 323/8 |
| 4,413,313 | 11/1983 | Robinson | 363/80 |
| 4,442,397 | 4/1984 | Ishikawa et al. | 323/275 |
| 4,649,334 | 3/1987 | Nakajima | 323/299 |
| 5,032,972 | 7/1991 | Erckert | 363/97 |
| 5,179,511 | 1/1993 | Trovk et al. | 363/97 |

FOREIGN PATENT DOCUMENTS

| | | | |
|---|---|---|---|
| 0180966 | 5/1986 | European Pat. Off. | H02M 7/523 |
| 4123416 | 1/1993 | Germany | G05F 1/613 |

OTHER PUBLICATIONS

IEEE Journal of Solid–State Circuits, vol. SC–10, No. 3, Jun. 1973, pp. 168–176, Nathan O. Sokal and Alan D. Sokal,"Class E—A New Class of High–Efficiency Tuned Single–Ended Switching Power Amplifiers".

Primary Examiner—Matthew V. Nguyen
Attorney, Agent, or Firm—Wolf, Greenfield & Sacks, P.C.

[57] ABSTRACT

A resonant inverter comprises a resonant circuit, a source, an electronic switch and a control circuit. In order to permit low loss operation on the basis of a simple circuit structure, the control circuit comprises a voltage detection circuit, a current detection circuit, and a control signal generation circuit connected downstream of the voltage detection circuit and the current detection circuit and used for generating a control signal for the electronic switch, the control signal generation circuit switching the electronic switch to a first switching state when the voltage detection circuit responds and to a second switching state when the current detection circuit responds.

24 Claims, 8 Drawing Sheets

RESONANT INVERTER

FIELD OF THE INVENTION

The present invention refers to a resonant inverter comprising a resonant circuit, a source, an electronic switch means and a control circuit.

The present invention deals in general with a resonant inverter e.g. in the form of an oscillator or of a self-excited narrowband high-frequency amplifier for driving a purely ohmic load, an ohmic capacitive load or an ohmic inductive load.

DESCRIPTION OF THE PRIOR ART

Inverters and switched-mode mains power supplies normally comprise bipolar components, irrespectively of whether they work with a resonant circuit or are able to operate without such a resonant circuit. One embodiment of such a known inverter is, by way of example, disclosed in the following company publication: S. Lowbridge, M. Maytum, K. Rutgers: Electronic Ballasts for Fluorescent Lamps using BUL 770/791 Transistors (Texas Instruments, 1992). This inverter is a self-excited half-bridge circuit working with bipolar transistors, reverse diodes, a series resonant circuit and inductive base feedback. Such a circuit is also classified as a class D amplifier. Due to the lossy draining of the minority carriers of the bipolar components, such circuits can only be operated up to a specific maximum frequency. Even if minority carrier-free MOS transistors are used, such circuits show the disadvantage of capacitive drain losses, since the switch elements must be switched on under voltage. In addition to the losses and frequency limitations explained hereinbefore, other disadvantages of such inverters exist with regard to the large number of components required as well as with regard to the fact that it is impossible to implement load regulation in a simple manner.

The technical publication N.0. Sokal, A.D. Sokal: Class E —A new Class of High Efficiency Tuned Single-Ended Switching Power Amplifiers (IEEE Journal of Solid-State Circuits, Vol. SC-10, No. 3, June 1975) discloses high-frequency amplifiers of the so-called E class which need only a single switch and which have a high efficiency. Such amplifiers are predominantly used as transmitter amplifiers and are operated by means of an externally generated clock pulse with an on time which is approximately half as long as the period duration. Load regulation is not carried out in connection with such high-frequency amplifiers, since this type of amplifier operates at a fixed frequency and with an approximately constant load.

To sum up, it can be stated that, as far as known inverters are concerned, the inverters in the form of half-bridge circuits which were described at the beginning are not suitable for a so-called single-chip solution, which makes use, for example, of a single vertical DMOS transistor, because they require pairs of transistor circuits, that these inverters do not permit load regulation, necessitate a large number of components and show high power losses. Furthermore, such circuits only operate at comparatively low frequencies so that comparatively large capacitive and inductive components are required.

The class E amplifier described has a fixed predetermined frequency within a narrow frequency tolerance range, the clock pulse with a ratio of on time to period duration of 0.5 being generated externally so as to permit optimum operation of the amplifier.

FIG. 1 of U.S. Pat. No. 4,413,313 discloses a resonant inverter which comprises a resonant circuit, a source, an electronic switch means and a control circuit, said control circuit having the following features: a voltage detection circuit responding to a voltage value of the voltage drop across the electric switch means, a current detection circuit responding if the current flowing through the switch means exceeds a specific value, and a control signal generation circuit connected downstream of said voltage detection circuit and said current detection circuit and used for generating a control signal for the electronic switch means. The current detection circuit produces on its output side a "high" signal as soon as a current flows through the resistor in the direction of the second connecting terminal of the inverter. The threshold value of this circuit, which is constructed as a comparator circuit, is set to zero. The threshold value $V_{TH}$ of the voltage detection circuit is set to a positive value. The two output signals of these detection circuits are interconnected by an AND gate. This means that the switch will only be switched to its on state if, on the one hand, the current which flows through the resistor has a value above zero and if, on the other hand, the voltage drop across the switch has reached a value above $V_{TH}$. If either the current detection circuit or the voltage detection circuit or both detection circuits do not respond, the switch will remain closed. It follows that this publication discloses the use of a current-limiting switch, i.e. of a switch having a non-linear characteristic in its on state, since otherwise the voltage across this switch cannot rise in a defined manner.

U.S. Pat. No. 5,179,511 discloses a class E inverter circuit working with a single switch and including a current detection circuit which detects the zero passage of the current and which controls the single switch on the basis of the detected zero passage and a fixed time delay predetermined by a time delay element.

SUMMARY OF THE INVENTION

It is the object of the present invention to provide a resonant inverter of the type described at the beginning, which can be operated at high frequencies although it has a simple circuit structure.

This object is achieved by a resonant inverter comprising a resonant circuit, a source, an electronic switch means and a control circuit having the following features:

a voltage detection circuit responding to a voltage value of the voltage drop across the electric switch means related to a voltage reference;

a current detection circuit responding to a current value of the current flowing through the switch means and/or the resonant circuit, related to a current reference, and a control signal generation circuit connected downstream of said voltage detection circuit and said current detection circuit and used for generating a control signal for the electronic switch means, wherein the control signal generation circuit switches the electronic switch means to a first switching state when the voltage detection circuit responds and to a second switching state when the current detection circuit responds.

In accordance with the present invention, the control circuit of the resonant inverter comprises, on the one hand, a voltage detection circuit responding to the voltage drop across the electronic switch means close to the zero passage, and, on the other hand, a current detection circuit responding when the current flowing through the electronic switch means and/or the resonant circuit exceeds a predetemined current value, as well as a control signal generation circuit which is connected downstream of said voltage detection circuit and said current detection circuit and which switches the electronic switch means to a first switching state when the voltage detection circuit responds and to a second switching state when the current detection circuit responds.

The resonant inverter according to the present invention has a circuit structure which is similar to the circuit structure of a class E amplifier. The control circuit according to the present invention, however, enforces a mode of operation in which the current within the switch means and the resonant circuit only rises during the on time. For a typical mode of operation of the resonant inverter according to the present invention, the ratio of the on time to the period duration is approximately 0.25 to 0.3.

The structural design of the control circuit of the resonant inverter according to the present invention is such that the expenditure for the whole inverter circuit is substantially reduced. Furthermore, a strong reverse-mode operation of the electronic switch means is avoided so that the resonant verter according to the present invention operates with extremely low losses, in particular if an MOS transistor is used as an electronic switch means.

The inverter according to the present invention effects a load regulation. The electronic switch means of the resonant inverter according to the present invention is switched on when the voltage across the electronic switch means has become almost zero, and it is switched off when the current through the electronic switch means and through the resonant circuit has reached a predetermined maximum value. The greater the load, the earlier this maximum wil be reached, whereby the switch-on width and the frequency will be reduced as the load increases and the voltage across the load will be readjusted.

It follows that, in spite of the simple circuit structure used, the resonant inverter according to the present invention effects low-loss driving of variable loads at high frequencies.

The resonant inverter according to the present invention can be realized as a single-chip solution, e.g. in a so-called smart-power technology. When high-voltage switches are used as an electronic switch means, operation with rectified dc line voltage is possible. The control circuit required operates with very low losses, especially when an MOS transistor is used. In this case, high switching speeds can be achieved. In view of the resultant high frequency, small capacitive and inductive components will suffice for the resonant inverter according to the present invention.

Figure 1:
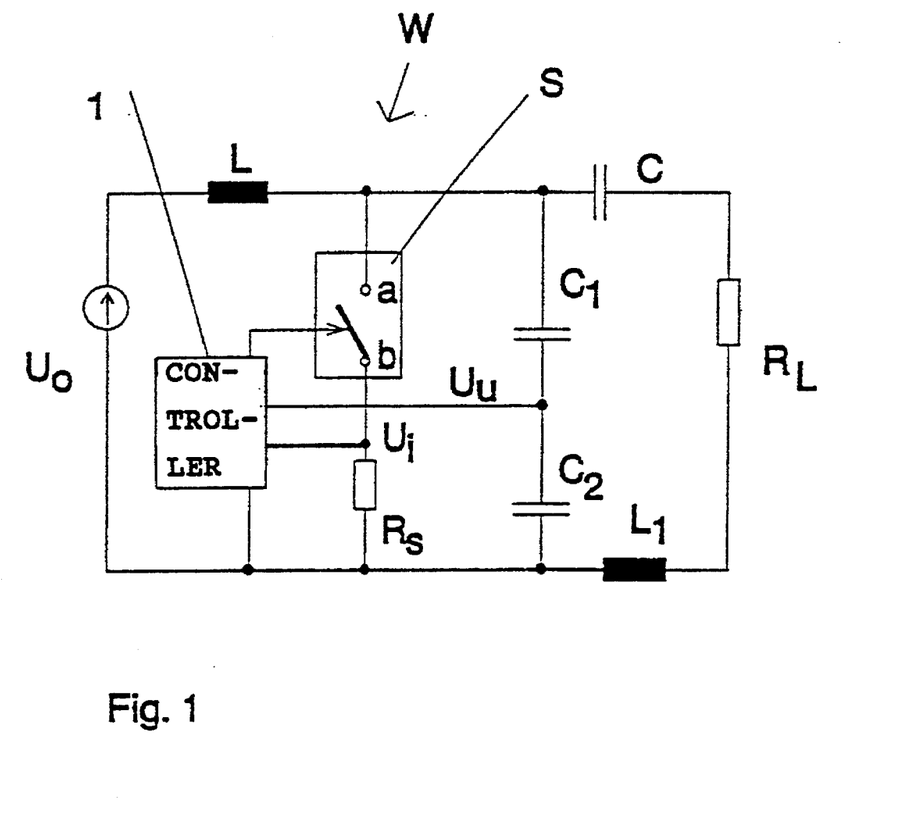
FIG. 1 shows a circuit diagram of a first embodiment of the resonant inverter according to the present invention.

The resonant inverter in accordance with the invention, which will be explained hereinbelow by way of example making reference to FIG. 1 to 3, uses, in accordance with a first aspect of the present invention, at least one fixed reference voltage, which is required for switching the switch means on or off in response to specific values of the current through and of the voltage across the switch. As will additionally be explained hereinbelow, it is an object of the present invention to maintain the inverter according to the present invention, which is a so-called class E converter, in a state where the lowest possible losses occur. This object is to be achieved even if the input voltage or the load vary.

For regulating the converter e.g. with regard to the output load or the output voltage, it can be dimensioned according to specific criteria without any necessity of changing the frequency or the on time. Mathematical suggestions in this respect already exist (cf. G. H. Smith/R. E. Zulinski: "A precise Analysis of a high efficiency self-regulated Class E Power Inverter/Converter", Midwest Symposium on Circuits and Systems 1988, Proc. 31, pages 219 to 222).

Another imaginable method of regulation is to tap the voltage on the load and to counteracts variations of said voltage by adjusting the frequency of the amplifier. (Cf. R. Redl/B. Molnar: "Design of a 1.5 MHz regulated DC/DC Power Converter", International PCI Conference on Power Conversion 1983, Proc. pages 74 to 78).

In addition, it is also imaginable to tap the input voltage to obtain a frequency change for controlling the amplifier with regard to uniform output power or output voltage.

Such imaginable methods of regulating class E amplifiers or of setting the operating point of such amplifiers have the disadvantage that it is either necessary to set a comparatively precise frequency or on time or that very precise reference voltages are required for achieving a specific switching frequency or a low loss state. This is one of the reasons for the fact that the industrial application of class E amplifiers is, at present, still of secondary importance in comparison with conventional switched-mode mains power supplies and converter solutions. One of the essential aspects in this respect is that the maximum transistor blocking voltage can be exceeded by inadmissible frequency deviations and that, without additional protective measures, this would destroy the transistor.

Furthermore, it is known that reference voltage sources and frequency generators integrated on a chip show a technologically conditioned inaccuracy which can only be improved by external balancing elements or self-adjusting structures occupying large areas on the chip.

In accordance with a further aspect, the present invention aims at providing a resonant inverter of the type mentioned at the beginning which is capable of functioning without any precisely defined reference sources for the current and/or voltage.

This object of the present invention is achieved by a resonant inverter comprising a resonant circuit, a source, an electronic switch means and a control circuit having the following features:

a voltage detection circuit responding to a voltage value of the voltage drop across the electric switch means related to a voltage reference;

a current detection circuit responding to a current value of the current flowing through the switch means and/or the resonant circuit, related to a current reference, and a control signal generation circuit connected downstream of said voltage detection circuit and said current detection circuit and used for generating a control signal for the electronic switch means, wherein the control signal generation circuit switches the electronic switch means to a first switching state when the voltage detection circuit responds and to a second switching state when the current detection circuit responds, wherein the current detection circuit detects per cycle of the current curve of the current flowing through the switch means and/or the resonant circuit at least two time intervals which are displaced relative to each other, and wherein, by comparing these time intervals, the control circuit determines the value of the voltage reference used by the voltage detection circuit.

Further, this object of the present invention is achieved by a resonant inverter comprising a resonant circuit, a source, an electronic switch means and a control circuit having the following features:

a voltage detection circuit responding to a voltage value of the voltage drop across the electric switch means related to a voltage reference;

a current detection circuit responding to a current value of the current flowing through the switch means and/or the resonant circuit, related to a current reference, and a control signal generation circuit connected downstream of said voltage detection circuit and said current detection circuit and used for generating a control signal for the electronic switch means, wherein the control signal generation circuit switches the electronic switch means to a first switching state when the voltage detection circuit responds and to a second switching state when the current detection circuit responds, wherein the voltage detection circuit detects per cycle of the voltage curve of the voltage dropping across the switch means at least two time intervals which are displaced relative to each other, and wherein, by comparing these time intervals, the control circuit determines the value of the current reference used by the current detection circuit.

The control circuit according to the above aspects of the invention achieve the regulation as follows: either the current curve of the current flowing through the switch and/or the resonant circuit or the voltage curve of the voltage across the switch is compared with threshold values so as to form two time intervals per cycle of the current curve or voltage curve which are displaced relative to each other, whereupon the control circuit compares the time intervals with each other and determines, on the basis of the time intervals of the current curve, the value of the voltage reference used by the voltage detection circuit and, on the basis of the time intervals of the voltage curve, the value of the current reference used by the current detection circuit.

In the class E converter with zero-voltage switch, the voltage curve of the voltage across the switch can be detected more easily than the current curve of the current through the switch. The same applies to the zero-current switch with regard to the current curve of the current flowing through the switch. The reason for this is an almost sinusoidal voltage curve in almost all necessary operating conditions for the zero-voltage switch as well as the return of the voltage to zero; this applies mutatis mutandis to the zero-current switch with regard to the current curve. It follows that, as far as the zero-voltage switch is concerned, the voltage curve of the voltage across the switch should be detected through at least two threshold values and used for generating at least two successive time intervals, the reference voltage for the current detection circuit being then calculated on the basis of these time intervals in accordance with the present invention. In the simplest case, such a calculation is carried out by deciding whether the current reference voltage for the current detection circuit should be increased or decreased. It is also possible to use, e.g. for very fast circuits, reference currents instead of reference voltages, provided that the voltage and current detection circuits work with current comparators instead of voltage comparators.

The statements made hereinbelow using the zero-voltage switch as an example apply mutatis mutandis to the zero-current switch.

A conclusion which can be drawn from the physical-mathematical properties of the class E amplifier is that the power supplied to a constant output load will remain almost constant if the time width and the maximum amplitude of the voltage curve of the voltage across the switch remain approximately constant during the off state, even if the input voltage varies within wide limits. Such variations may include e.g. a control range up to 1:4. In addition, the positive voltage curve of the switch during its off state is almost symmetrical in time with regard to the amplitude value so that the information on one of the two time periods before or after the instant the amplitude value is reached will suffice to know the whole curve, leaving out of account negligible deviations. It follows that the present invention provides a circuit which adjusts the reference voltage for the current frequency in such a way that the temporal voltage curve of the voltage across the switch remains constant with regard to duration and amplitude; this is achieved by comparing two successive time intervals e.g. of the voltage curve of the voltage rising from zero across the switch, these being associated with reaching the amplitude value and an additional intermediate value above zero, and by maintaining these time intervals in a fixed time ratio to each other.

The same method can be used for generating an input-voltage-dependent and, consequently, frequency-dependent voltage overshoot across the output load. For this purpose, the output load must be of the ohmic-capacitive or inductive-capacitive or ohmic-inductive-capacitive type. In the simple case of an ohmic-capacitive load, the resonance point between the resonant circuit inductance of the amplifier and the capacitive load component is hit more or less due to the input-voltage-dependent frequency variation of the controlled amplifier, so that the voltage overshoot will increase or decrease. This effect can be utilized e.g. for igniting discharge tubes or for generating ignition sparks. When a parallel-resonant circuit is used as an output load, the same effect can be used for current overshoot in this circuit, e.g. for producing strong magnetic fields.

It follows that the above-described regulation of the class E amplifier as a time interval comparison regulation according to the present invention can primarily be used as a dc controlled ac source in the case of a high-ohmic load or as a constant-power source in the case of a low-ohmic load.

An additional advantage in this respect is that the reference voltage for the current detection circuit is a calculated function of at least two successive time intervals of the voltage curve of the voltage across the switch, without any precise reference voltages for setting an operating point of the amplifier being necessary for this purpose. The current frequency is preferably generated by a regulator with integrating behaviour for guaranteeing stability of the regulating circuit.

Precise reference voltages are not required because the comparison of two successive time intervals can easily be mastered on a chip as far as the circuit technology is concerned, e.g. by the matching of chip structures, such as voltage and current sources, resistors and capacitors, independently of their absolute value.

The tapping of at least three instants of the voltage curve is preferably carried out by choosing the time at which the voltage begins to rise across the switch to coincide with the switching off of the switch so that a first instant is predetermined by the switch off signal.

The voltage across the switch is preferably tapped by a capacitive voltage divider, which, with regard to its dc voltage high ohmic tap, is additionally clamped to a defined voltage range relative to the switch ground or at least relative to one of the two switch terminals. The term switch ground is here used for the switch terminal which is connected to the negative potential of the input dc source of the converter or which is nearer to this potential than the other switch terminal. Such clamping is preferably carried out by means of two electric valves which are connected anti-parallel and which have defined flow or breakdown voltages above zero, or by an electric valve having a defined flow and breakdown voltage in both directions (e.g. Zener diode).

The above-described potential clamping circuit has connected in series therewith preferably a current sensor, e.g. in the form of a small ohmic resistor, which detects the total current flowing through the clamping circuit. For further processing the signals thus obtained from the voltage detection circuit, it will suffice to merely ascertain whether or not a current flows through the clamping circuit. Optionally, the current direction is ascertained as well. The current across the clamping circuit (electric valves) begins to flow when the voltage rising across the switch scaled according to the capacitive voltage divider ratio has reached the breakdown or flow voltage of the respective valve. This current flows through the clamping circuit until the voltage across the switch ceases to rise, or rather until it drops again. In the case of an ohmic voltage divider of the voltage detection circuit, the instant at which the voltage maximum occurs cannot be detected directly, but only an interval which is symmetrical with respect to this instant; this fact will not be dealt with in detail in the statements made hereinbelow. For the capacitive divider, the instant at which the flow of current through the clamping circuit terminates is, due to the operating conditions, approximately identical with the instant at which the maximum amplitude of the switch voltage (peak value) occurs. Hence, three instants have already been detected, and it is essentially only the middle instant that depends on the flow or breakdown voltage of one of the valves as well as on the magnitude of the divider capacitance. The capacitive voltage divider is, relative to the control circuit, an external component which can easily be realized with accuracies down to 1%. The accuracy of flow and breakdown voltages can, for physical reasons, be adjusted to less than 5% in most cases, this being possible even in cases where these diodes are integrated on a chip.

In addition, the matching of the anti-parallel connected diodes can be utilized by comparing the time intervals of the positive and negative current directions through the diodes and by carrying out, on the basis of the weighted difference thereof, a correction of the instant at which the flow and breakdown voltages are reached across the respective valve so that the technological fluctuation of the absolute value of the flow and breakdown voltages is eliminated.

On the basis of all these measures, it is possible to avoid high accuracy requirements which have to be fulfilled by the voltage references of the signal generation circuit and to replace these accuracy requirements by physical properties of the class E amplifier, which are predominantly conditioned by the passive elements of the amplifier, as well as by preferably at least one or two clamping elements of the voltage detection circuit.

BRIEF DESCRIPTION OF THE DRAWINGS

In the following, a preferred embodiment of the resonant inverter according to the present invention will be explained in detail with reference to the drawings enclosed, in which.

DESCRIPTION OF THE PREFERRED EMBODIMENTS OF THE INVENTION

The first embodiment of a resonant inverter according to the present invention, designated generally by the reference sign W, comprises a series-resonant circuit whose resonant frequency is essentially determined by the capacitance of a resonant circuit capacitor $C_1$ and the inductance of a resonant circuit inductor $L_1$. The resonant circuit inductor is in series with a load $R_L$ as well as with a dc blocking capacitor C whose capacitance exceeds that of the resonant circuit capacitor $C_1$ and thus influences the resonant frequency of the thus formed series-resonant circuit $C$, $C_1$, $L_1$ only to an insignificant extent. The inverter additionally comprises a voltage source $U_O$ and a choke L connected in series with said voltage source. The inductance of this choke L exceeds that of the resonant circuit inductor $L_1$. The series-resonant circuit $C$, $C_1$, $L_1$ and the load $R_L$ have connected in parallel thereto a capacitive voltage divider on the one hand, said capacitive voltage divider consisting of the resonant circuit capacitor $C_1$ and an additional voltage divider capacitor $C_2$, and the series connection of an electronic switch S and a series resistor $R_S$ on the other. As can especially be seen from FIG. 2, the electronic switch S is defined by an MOS transistor 8 in the preferred embodiment shown.

A control circuit 1, whose output signal actuates the electronic switch S and is supplied to the gate terminal of the MOS transistor, has supplied thereto two voltage signals on the input side. These signals are, on the one hand, the voltage signal $U_u$ at the voltage divider node and, on the other hand, the voltage signal $U_i$ at the common node of the electronic switch S and the series resistor $R_S$.

The control circuit generally comprises a voltage detection circuit, which responds to a voltage value of the voltage drop $U_u$ across the electronic switch means S close to the zero passage of the voltage drop, as well as a current detection circuit, which responds when the current flowing through the switch means S or through the resonant circuit exceeds a specific value. In the preferred embodiment, the current detection circuit can respond to the voltage drop $U_i$ across the series resistor $R_S$. It is also possible to provide the resonant circuit inductor $L_1$ with a tapping point for measuring the current there indirectly via an induced voltage.

Instead of an MOS transistor 8 (cf. FIG. 2), a so-called multi-source transistor 8' (cf. FIG. 3) can be used for obtaining the current-indicative signal $U_i$. When such a multi-source transistor 8' is used, one source electrode of this transistor 8' is connected directly to the reference potential point, whereas the other electrode is connected to the reference potential via the series resistor $R_S$ for producing the voltage drop $U_i$. As for the rest, this embodiment according to FIG. 3 corresponds to that according to FIG. 1.

In the embodiment shown, the voltage divider circuit consists of a capacitive voltage divider $C_1$, $C_2$.

It is also possible to use an ohmic voltage divider, although this is regarded as a less preferred embodiment. In this case, the voltage divider capacitor $C_2$ is no longer necessary.

The control circuit comprises in any case a control signal generation circuit 6, 7 for generating the control signal for the electronic switch means S, which switches the electronic switch means S to a first switching state when the voltage detection circuit responds and which switches said electronic switch means S to a second switching state when the current detection circuit responds. The first switching state is preferably the through-connecting state or on state, whereas the second switching state is preferably the open-circuit condition.

Figure 2:
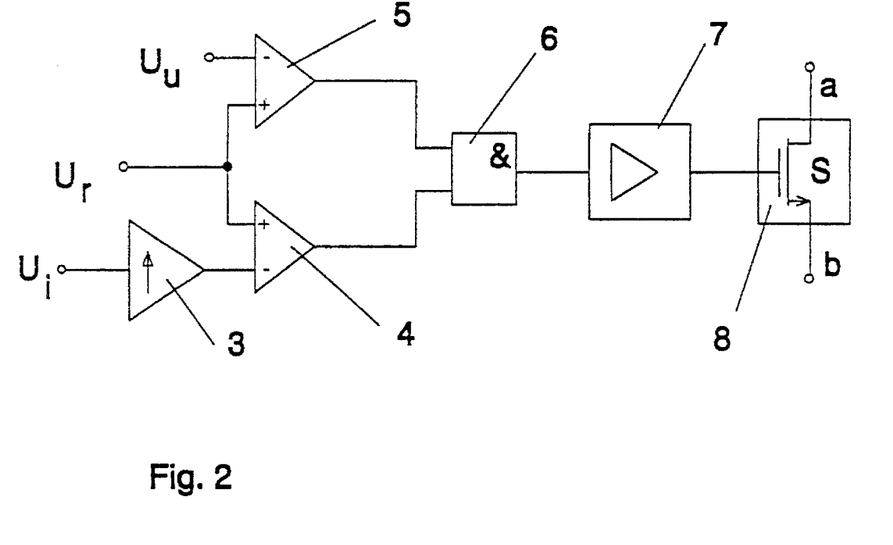
FIG. 2 shows an embodiment of the control circuit of the inverter shown in FIG. 1.
Figure 3:
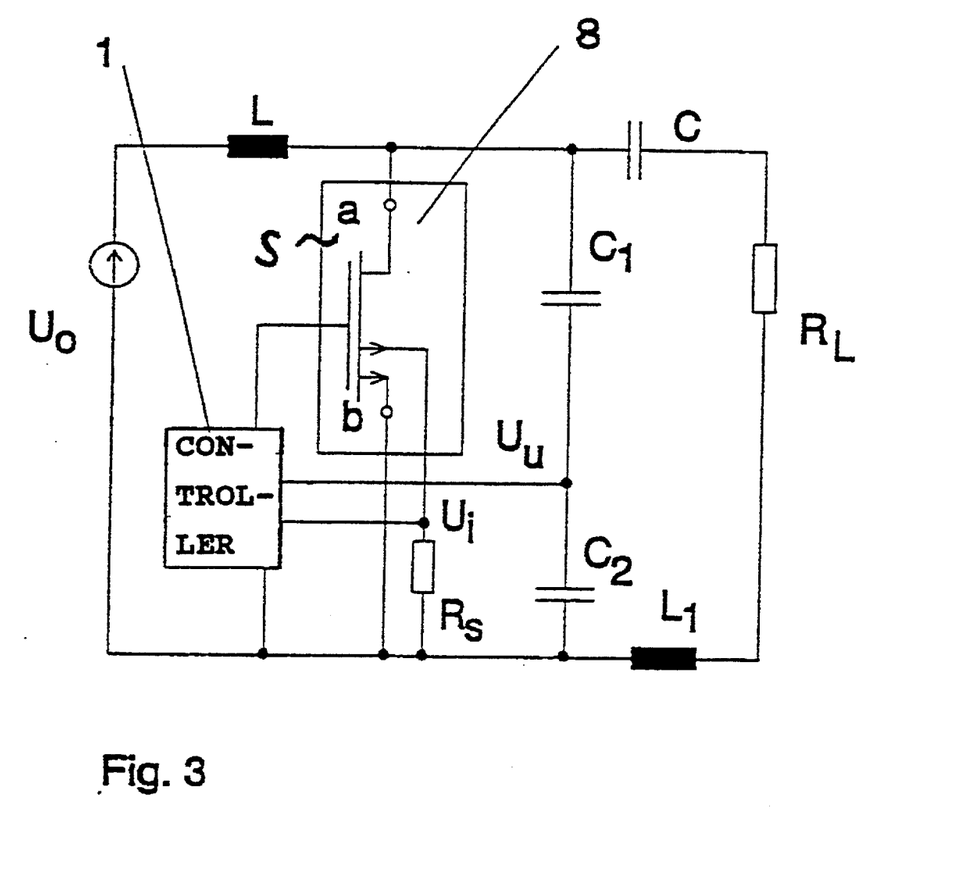
FIG. 3 shows a circuit diagram of a second embodiment of the resonant inverter according to the present invention.

In the preferred embodiment according to FIG. 2, the control circuit comprises, on the side of the current detection circuit, a first comparator 4 having a reference potential $U_r$ applied to its non-inverting input, whereas the inverting input is connected to the output of a level shift circuit 3 whose input side is connected to the common node of the switch means and the series resistor $R_S$. This level shift circuit may, for example, be an amplifier which is connected upstream of the first comparator 4 and which may be required for adapting the reference voltage.

In this embodiment, the voltage detection circuit is defined by a second comparator 5 to whose non-inverting input the reference potential $U_r$ is also applied, whereas the inverting input is connected to the common node of the voltage divider capacitors $C_1$, $C_2$.

The output sides of the two comparators 4, 5 are connected to the inputs of an AND gate 6 controlling a drive circuit 7 which, together with the AND gate 6, forms the control signal generation circuit. On the output side, the drive circuit 7 is connected to the gate terminal of the MOS transistor 8.

In the embodiments shown, the resonant circuit is a series-resonant circuit. In accordance with a less preferred embodiment, a parallel-resonant circuit may be used as well.

The embodiments of the resonant inverter according to the present invention as disclosed in FIG. 4 to 7 correspond to one another as well as to the embodiments according to FIG. 1 to 3 with the exception of the differences explained hereinbelow. In order to avoid repetitions, like reference numerals have been used to designate identical elements so that it is not necessary to explain these elements again.

Figure 4:
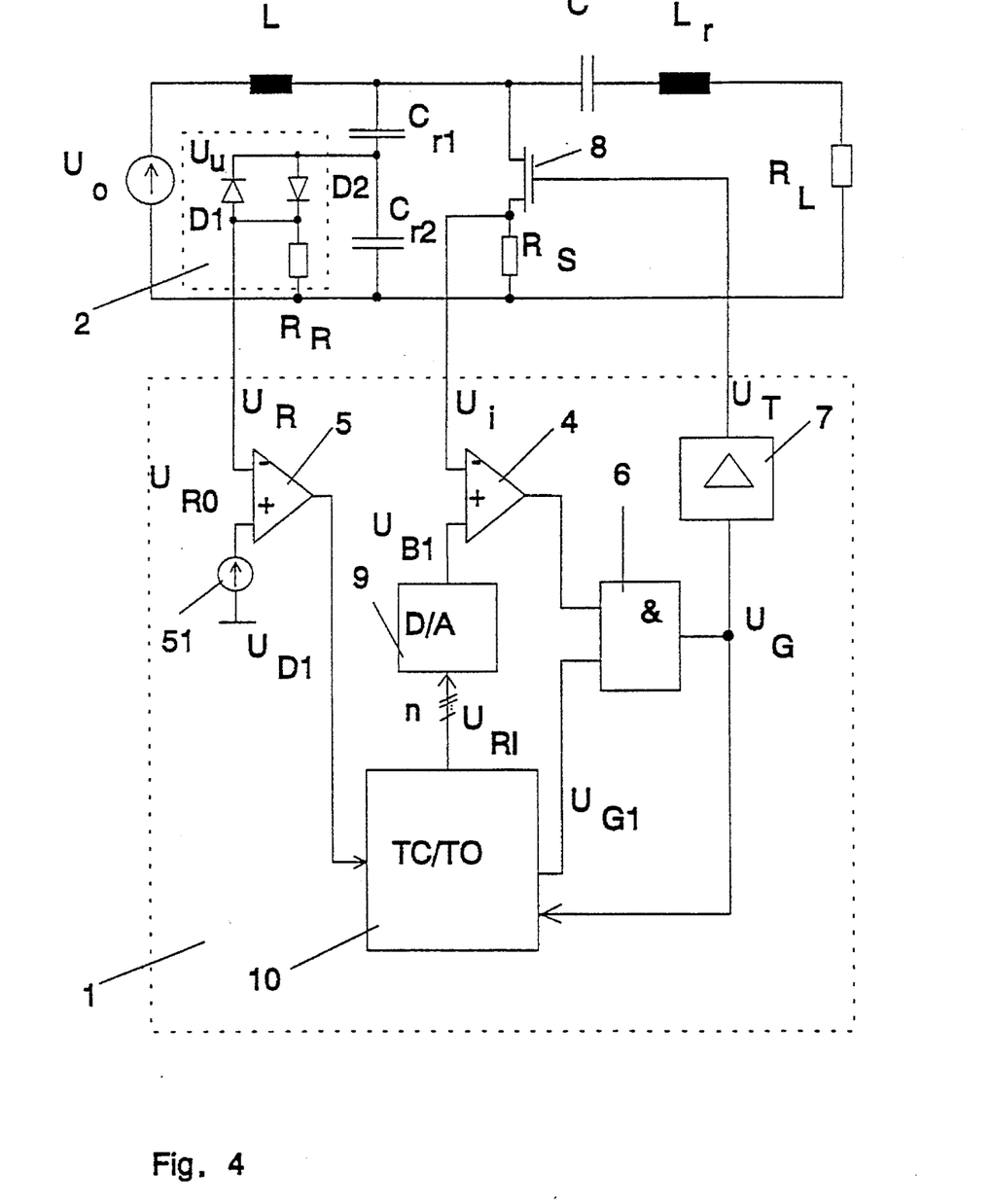
FIG. 4 shows a second embodiment of the control circuit of the resonant inverter.

FIG. 4 shows an additional embodiment of the control circuit 1. Via the two diodes D1 and D2, the voltage drop $U_u$ is maintained between the potentials of their flow voltages relative to ground; it is, however, variable within this interval. The signal of the voltage detection circuit $U_R$ is tapped via the series resistor $R_R$, said signal serving as input signal for the voltage comparator 5. The reference voltage $U_{RO}$ is in this case a low voltage, greater than zero, which does not have a precisely defined value. This value depends on the properties of the comparator 5, e.g. the response threshold (offset), the dynamic properties as well as the stabilization of this reference voltage.

Said reference voltage may, however, vary e.g. by 100%, without any essential changes in the detected time interval being caused, i.e. it will be possible to achieve changes of less than 1%. This is due to the fact that the response threshold of the comparator 5 is exceeded within a very short time interval, i.e. almost by a square pulse. The real pulse has approximately the shape of a sinusoidal half wave, which, however, has a zero passage rise which is much steeper than that of a sinusoidal function.

The comparator output voltage $U_{D1}$ serves together with the switch control voltage $U_G$ (in this case for an MOS transistor) as a calculation quantity for the digital adjustment of the current reference $U_{RI}$, which, in the present example, is transmitted as an analog signal via a D/A converter 9 to the current comparator 4 as a variable reference voltage $U_{RI}$. This transmission is normally effected by means of a regulator, which is preferably an integrator, so that stable regulation is guaranteed. Simultaneously, the reclosing time is produced via the time-interval comparator circuit 10 in the form of the signal $U_{G1}$ and is used together with the output of the current comparator 4 via a link 6 for controlling the transistor 8 via the driver 7.

Figure 5:
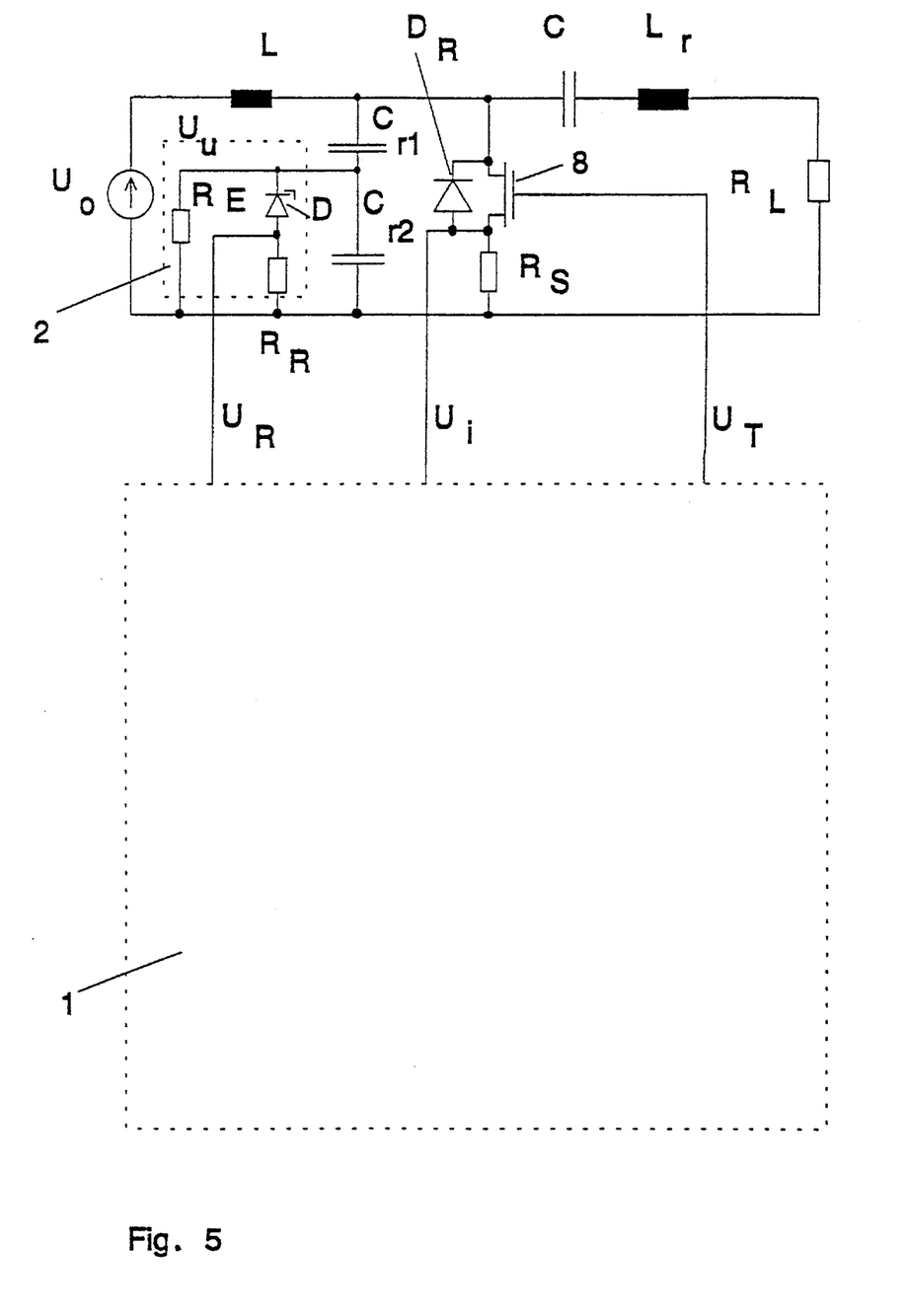
FIG. 5 shows a modified embodiment of the resonant inverter.

FIG. 5 shows a variant of the decoupling circuit 2 for the voltage detection circuit with only one diode D. The diode has a flow voltage in one direction and a breakdown voltage in the other. In addition, a high ohmic discharge resistor $R_E$ is connected to ground from the tap $U_u$ so as to avoid floating of the potential, e.g. in a defined starting state.

The diode $D_R$ which is anti-parallel to the transistor 8 guarantees that the transistor can be switched to a reverse mode of operation at any time.

Figure 6:
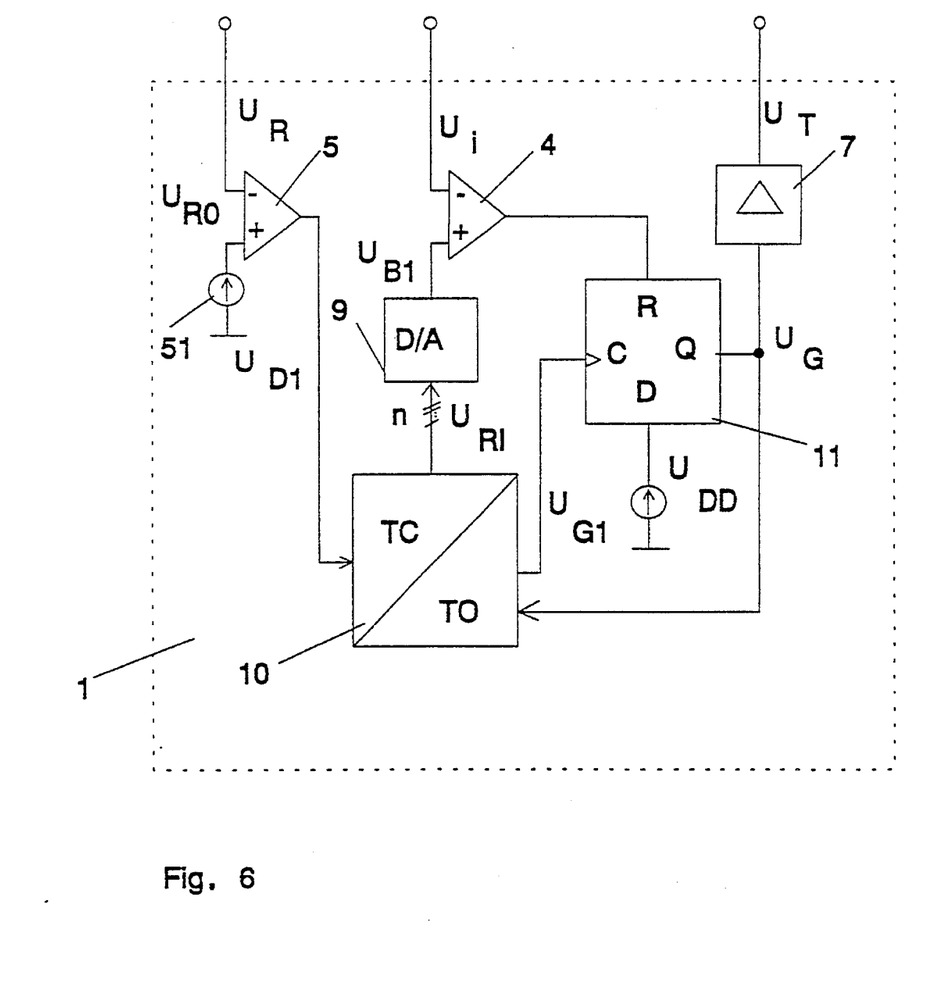
FIG. 6 shows a third embodiment of the control circuit.

FIG. 6 shows a modified structural design of the control circuit 1 including a flip-flop 11 for producing the signal $U_G$. Furthermore, the circuit 10 used for carrying out the time interval comparison is subdivided into two circuit parts TC and TO.

Figure 7:
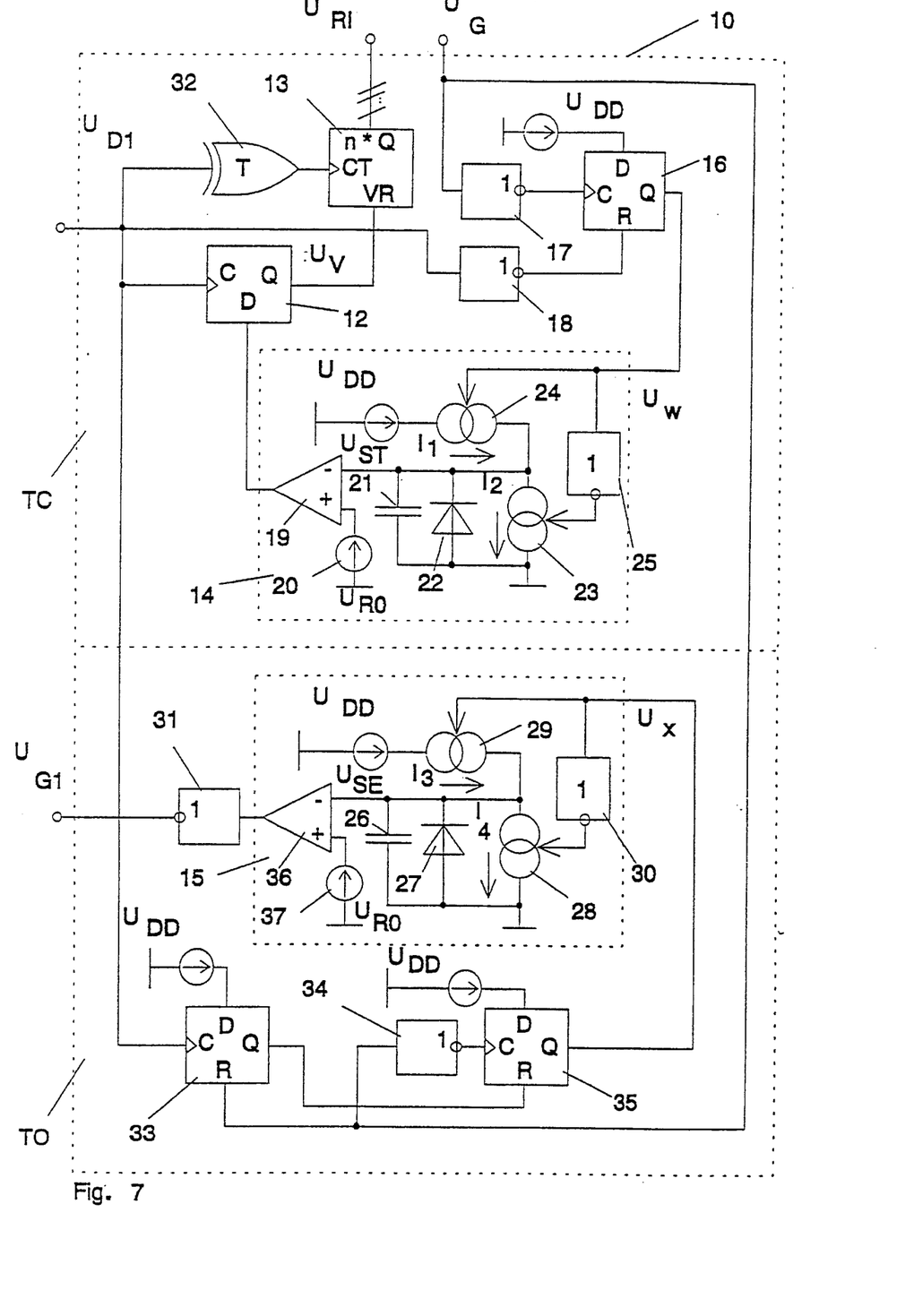
FIG. 7 shows a fourth embodiment of the control circuit.

FIG. 7 shows a preferred variant of the circuit 10 in which the time interval comparison for regulation with regard to constant power is carried out in the subcircuit TC. For this purpose, the signal $U_{D1}$ from the voltage detection circuit is utilized in the course of each periodic oscillation of the amplifier for clocking a D-type flip-flop 12 with the positive edge. This flip-flop transmits a calculated signal $U_v$ to an up-down counter 13 at the time the voltage maximum occurs at the switch (switching back of the voltage comparator), whereby the digital signal $U_{RI}$ is either increased or decreased. The calculation of the regulation comparison signal $U_v$ is carried out by means of a time-interval comparison circuit 14, which is controlled by a signal $U_w$. This signal $U_w$ is generated at the output of a flip-flop 16, which is set by the negated signal $U_G$ and which is reset by the signal $U_{D1}$. It follows that, when the switch switches off, the output of the flip-flop 16 is set and this marks the time where the voltage rise at the switch begins. By means of the signal $U_w$, the current source 24(I1) is Switched on, and the current source 23(I2) is switched off via the NOT operation 25. Up to this time, the current source 23 is short-circuited via a diode 22 which is as ideal as possible so that the voltage at the inverting input of the comparator 19 cannot become negative, but has approximately the value zero. From this zero value, the voltage now increases linearly at the inverting input, since the capacitance 21 is charged via the constant current source 24. As soon as the signal $U_w$ resets, i.e. when the voltage comparator switches back when the flow or breakdown voltage of a valve of the voltage detection circuit 2 has been reached, the flip-flop 16 is reset and switches the two current sources 23 and 24 back into the initial state. The capacitance 21 is now linearly discharged by the current source 23 until it has reached its initial voltage value again. In the course of this process, the comparison comparator 19 first switches back, when the signal at the inverting input rises, as soon as the reference voltage 20 ($U_{RO}$) has been reached. This voltage is a low reference voltage which is greater than zero and which does not have a precisely defined value. The time interval between the switching on and the switching off of the current reference 24 is now extended in the ratio of the currents I1 to I2, whereupon the comparator 19 switches on again. This has the effect that, at the time at which $U_{D1}$ is switched on again, a signal $U_v$ is generated, which evaluates whether the class E amplifier has reached its nominal on time and, consequently, the nominal frequency. It follows that, if complete correction were effected, the signal $U_v$ would be just at 50% between the two digital states at the time of through connection via the flip-flop 12. In practice this metastable condition is rarely achieved because the switching times are very short. The up-down counter can additionally be provided with a ternary input for detecting a third state with negligible regulation deviation. Such a large expenditure can, however, be avoided, if the latch 12 is provided with an additional circuit for suppressing or sufficiently reducing the probability of a metastability. A delay element 32 can ensure that a defined state will first be established at the up-down counter input before the counter is clocked most suitably by the same signal $U_{D1}$.

This avoids the risk of the counter assuming an undesirable state, whereby the peak voltage at the switch will be greatly exceeded when a non-admissible current reference has been set. A reliable method of avoiding this is to copy the respective count into a second counter. The latter is maintained in the last state for the time being, whereas the former continues to count. Following this, the deviation between the counters is compared and cancelled as soon as it is larger than one or at least k bits, i.e. the stored last state of the firt counter is written back into said first counter so that the current reference will not change in this case.

The circuit TO also has a time-interval comparison circuit 15 which serves to calculate the reclosing time of the switch. When the signal $U_G$ is switched off, a flip-flop 35 is first set via the NOT operation 34, said flip-flop 35 switching over the current sources 28 (I4) and 29 (I3). Via an additional flip-flop 33, the signal $U_{D1}$ sets the signal $U_x$ to the initial state by resetting the flip-flop 35 when the voltage maximum across the switch has been reached. From this time, the capacitance 26 ($C_G$) will be discharged again, and, after a time interval whose ratio to the time interval of the switched-over state of the two current sources 28 and 29 corresponds to the ratio of the currents I3 and I4, it will reach its initial voltage condition again. The time interval in which the two current sources 28 and 29 are switched over corresponds to the time interval in which the switch voltage increases from zero to its maximum value. It follows that the ratio of the two currents I3 and I4 must approximately be 1:1 for reclosing the switch via the signal $U_{G1}$ when an identical period of time has elapsed again. This switch-on signal is produced via the NOT operation 31 by the comparator 36, which functions in the same manner as the comparator 19 in circuit 14. It follows that, also in this case, a reference voltage 37 will suffice which need not be defined precisely with regard to its value. An additional advantage of this circuit is that it will reliably operate even in cases where the voltage across the switch does not fully return to zero, e.g. when dynamic transitions take place. The time at which the voltage minimum occurs is then still found for closing the switch in a manner entailing sufficiently low losses. Such a possibility would not exist, if the absolute value of the switch voltage were directly compared with a reference voltage close to zero. The ratio of the currents I3 to I4 may also be slightly larger than 1:1, if the switch only needs to be activated a certain time after the voltage zero value has been reached. This may be the case if the class E amplifier has been dimensioned such that the transistor, when switched on, becomes weakly reverse biased, since this will have the effect that, as can be seen in FIG. 5, a diode $D_R$, which is connected anti-parallel to the switch, goes into conduction and takes over the reverse current.

The operating conditions are such that this current will change its direction comparatively rapidly and then flow through the switch as positive current so that only a short time interval will be available as tolerance range for reclosing. This fact is advantageous with regard to the circumstance that, when designing a real circuit, minor deviations from the predetermined value will always occur, whereby an increased reliability of low loss switching on will be obtained.

Figure 8:
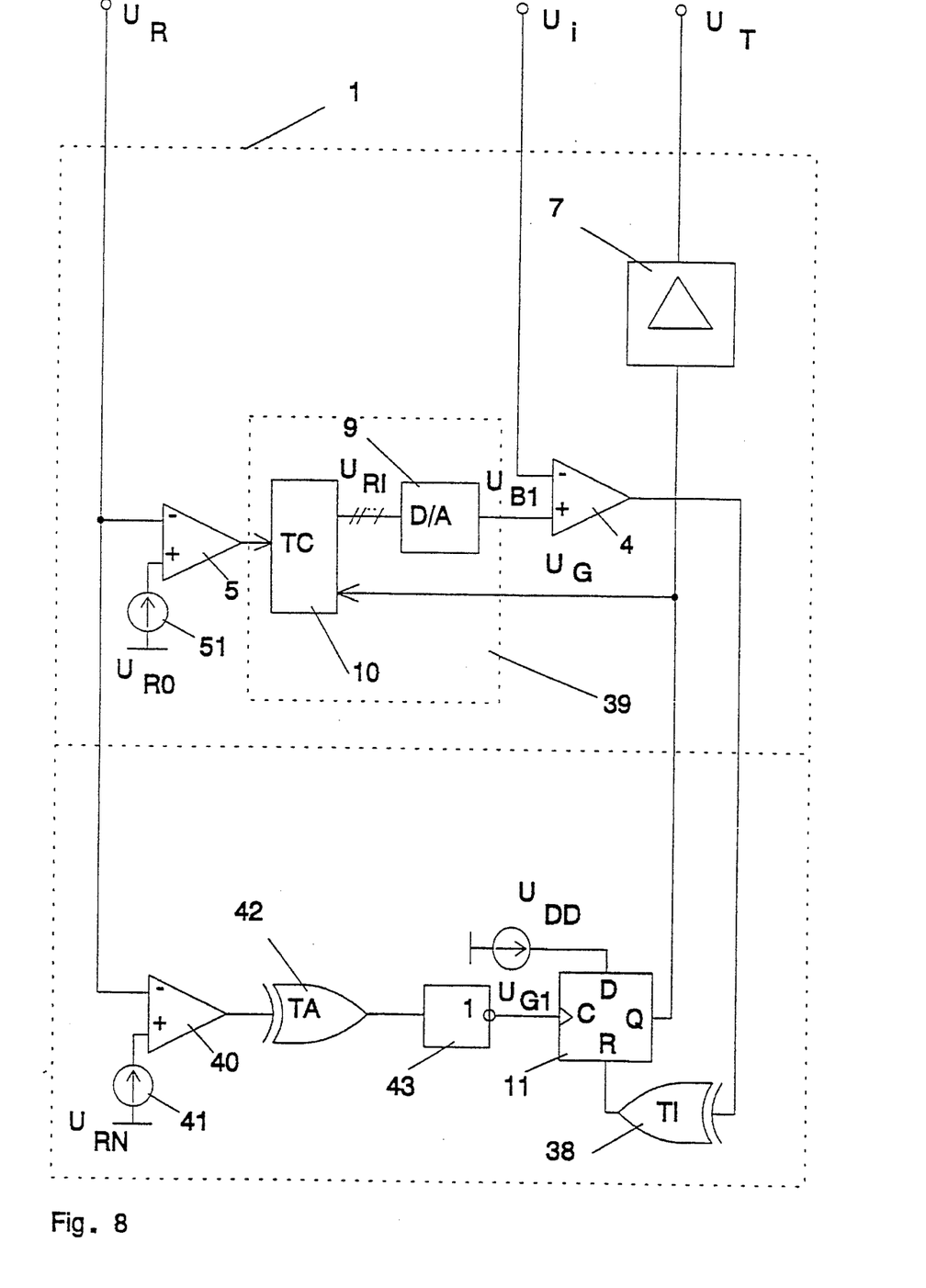
FIG. 8 shows a fifth embodiment of the control circuit.

FIG. 8 shows a different possibility of producing the switch-on signal for the switch. The signal $U_R$ from the voltage detection circuit is in this case evaluated by two comparators. The comparator 5 produces, just as in the case of FIG. 7, the signal for the time-interval comparison regulation. The regulation is preferably effected via an integrator 39 consisting also in the present example of a digital time-interval comparison circuit in combination with a D/A converter which is connected downstream of said comparison circuit, whereas a second comparator 40 with a low negative reference voltage 41 which does not have a precisely defined value is used for producing the switch-on signal, said comparator 40 detecting the the flow of current through the anti-parallel switched valves of the voltage detection circuit in the negative direction.

For mathematical reasons, there will be a fixed time interval between the instant at which the comparator 40 responds and the required instant of reclosing. Through a fixed time delay 42 (TA), the switch-on instant is transmitted to the flip-flop 11 via the NOT operation 43. The time delay element 42 can scatter with regard to its value TA by a tolerance value in the order of the width of the time interval within which a reverse current flows through the switch.

Furthermore, FIG. 8 discloses a time delay element 38 (TI) which provides an approximate linearization between the current frequency $U_{RI}$ to be set and the on time of the switch, whereby the regulation range of the amplifier can be extended once more with regard to its input voltage. For mathematical reasons, when the input voltage decreases, the current through the switch can initially rise sharply but then flattens off, whereby the maximum switch current will increase only to a minor degree towards longer on periods. In order to avoid such strong non-linearity, the preferably constant time delay TI is chosen such that it is slightly shorter than the shortest on time of the switch at the maximum input voltage so that a very low current reference $U_{RI}$ must be set for this case. If, however, the input voltage increases, this time delay will no longer exert such a strong influence on the on time so that the associated current reference will have to be changed approximately linearly with regard to the on time required. The delay element 38 can also be advantageous in cases where the current exceeds its maximum during the on time and then decreases again, e.g. when high-ohmic loads are involved. Due to the time delay TI, a reference current can serve to disable the switch already prior to the current maximum, whereby the mode of operation of the regulator is maintained during on periods which are longer than those of the embodiments described hereinbefore and for loads having higher impedances.

We claim:

1. A resonant inverter comprising a resonant circuit, a source, an electronic switch and a control circuit comprising:

a voltage detection circuit coupled to said electronic switch responding to a voltage value of a voltage drop across the electronic switch when the voltage drop has a predetermined relationship to a voltage reference;

a current detection circuit coupled to said electronic switch responding to a current value of current flowing through at least one of the switch and the resonant circuit, when the current value has a predetermined relationship to a current reference, and     a control signal generating circuit for generating a control signal for the electronic switch to switch the electronic switch to a first switching state when the voltage detection circuit responds and to a second switching state when the current detection circuit responds.

2. A resonant inverter according to claim 1, wherein the source comprises a voltage source and a choke connected in series with said voltage source, the resonant circuit is a series-resonant circuit resonant at a frequency having a defined period, and the switch means is closed in its first switching state and open in its second switching state.

3. A resonant inverter according to claim 1, wherein the control circuit controls the electronic switch in such a way that the ratio of the time the switch is closed to the period is less than 0.5.

4. A resonant inverter according to claim 3, wherein the control circuit controls the electronic switch in such a way that the ratio of the time the switch is closed to the period is between 0.1 and 0.4.

5. A resonant inverter according to claim 3, wherein the control circuit controls the electronic switch in such a way that the ratio of the time the switch is closed to the period is between 0.25 and 0.30.

6. A resonant inverter according to claim 1, wherein the current detection circuit comprises a resistor connected in series with the switch, and a first comparator connected to respond to the voltage drop across said resistor.

7. A resonant inverter according to claim 6, further including a level shift circuit connected between (a) a common node of the switch means and the series resistor and (b) an inverting input of the first comparator, and wherein a reference voltage is applied to the non-inverting input of the first comparator.

8. A resonant inverter according to claim 6, wherein the voltage detection circuit includes a voltage divider connection in parallel to the series combination of the resistor and the switch.

9. A resonant inverter according to claim 8, wherein the voltage divider is a capacitive voltage divider.

10. A resonant inverter according to claim 8, wherein the voltage divider is a resistive voltage divider.

11. A resonant inverter according to claim 8, wherein the voltage detection circuit additionally comprises a second comparator having an inverting input connected to a voltage divider node of the voltage divider and a non-inverting input connected to a reference voltage source.

12. A resonant inverter according to claim 1, wherein the series resonant circuit is in series with a load to be driven and said load is selected from among an ohmic load, an ohmic capacitive load and ohmic inductive load.

13. A resonant inverter according to claim 1, wherein the switch comprises a single transistor switch.

14. A resonant inverter according to claim 1, wherein the switch comprises a field effect transistor having at least two source electrodes.

15. A resonant inverter according to claim 14, wherein the current detection circuit comprises a resistor connected to one of the source electrodes of the field effect transistor, and a first comparator connected to detect the voltage drop across said resistor.

16. A resonant inverter according to claim 1, wherein the voltage detection circuit responds when the voltage value of the voltage drop across the electronic switch assumes a predetermined voltage value, and the current detection circuit responds when the current value of the current flowing through at least one of the switch and the resonant circuit exceeds a predetermined current value.

17. A resonant inverter according to claim 1, wherein the current detection circuit detects per cycle of the current waveform through at least one of the switch and the resonant circuit at least two time intervals which are displaced relative to each other, and wherein, by comparing these time intervals, the control circuit determines the value of the voltage reference used by the voltage detection circuit.

18. A resonant inverter according to claim 1, wherein the voltage detection circuit detects per cycle of the voltage waveform across the switch at least two time intervals which are displaced relative to each other, and wherein, by comparing these time intervals, the control circuit determines the value of the current reference used by the current detection circuit.

19. A resonant inverter according to claim 17, wherein the voltage across the switch is tapped by a capacitive voltage divider which is clamped with the aid of a clamping means with regard to its DC voltage high ohmic tap.

20. A resonant inverter according to claim 19, wherein the clamping means consists of two electric valves which are connected anti-parallel and which have a predetermined breakdown voltage above zero.

21. A resonant inverter according to claim 19, wherein the clamping means consist of an electric valve with predetermined breakdown voltages in both directions.

22. A resonant inverter according to claim 21, wherein the electric valve consists of a Zener diode.

23. A resonant inverter according to claim 18, further comprising a time-interval comparator means comprising a D-type flip-flop transmitting, essentially at the instant the voltage maximum occurs at the switch means or shortly afterwards, a signal to a counter in order to increase or decrease the current reference.

24. A resonant inverter according to claim 1, wherein a diode is switched antiparallel to the switch, said diode taking over the reverse current of said switch.

* * * * *